United States Patent
Tomisawa et al.

(10) Patent No.: US 7,292,392 B2
(45) Date of Patent: Nov. 6, 2007

(54) APPARATUS AND METHOD FOR DISPLAYING STEREOSCOPIC TWO-DIMENSIONAL IMAGE

(75) Inventors: Isao Tomisawa, Saitama (JP); Masaru Ishikawa, Saitama (JP)

(73) Assignee: Pioneer Corporation, Tokyo (JP)

( * ) Notice: Subject to any disclaimer, the term of this patent is extended or adjusted under 35 U.S.C. 154(b) by 265 days.

(21) Appl. No.: 10/986,464

(22) Filed: Nov. 12, 2004

(65) Prior Publication Data

US 2005/0122585 A1   Jun. 9, 2005

(30) Foreign Application Priority Data

Nov. 12, 2003   (JP) .......................... P2003-382946

(51) Int. Cl.
*G02B 27/22* (2006.01)
(52) U.S. Cl. .......................... 359/463; 353/10; 348/59; 472/61
(58) Field of Classification Search ................ 359/462, 359/463, 478, 479; 348/51, 54, 59; 353/7, 353/10; 396/330; 472/57, 61
See application file for complete search history.

(56) References Cited

U.S. PATENT DOCUMENTS 6,702,767 B1 *   3/2004   Douglas et al. ................ 601/15

2001/0022562 A1 *   9/2001   Ishikawa ........................ 345/9

FOREIGN PATENT DOCUMENTS

JP   10-221644 A   8/1998

* cited by examiner

*Primary Examiner*—Stephone B. Allen
*Assistant Examiner*—Lee Fineman
(74) *Attorney, Agent, or Firm*—Sughrue Mion, PLLC (57) ABSTRACT

An apparatus includes: an image display unit including a display device having an image display surface that displays a two-dimensional image and a microlens array disposed in spaced-apart relation to the image display surface, the image display unit that displays a stereoscopic two-dimensional image by allowing the light emitted from the image display surface to form an image on an image forming plane in a space located on a side opposite to the display device with respect to the the microlens array; at least one switch; at least one illumination device that illuminates the space when the switch is turned on; and a controller that controls the display device to change the two-dimensional image displayed on the image display surface in accordance with an illuminating state of the illumination device.

3 Claims, 6 Drawing Sheets

APPARATUS AND METHOD FOR DISPLAYING STEREOSCOPIC TWO-DIMENSIONAL IMAGE

The present disclosure relates to the subject matter contained in Japanese Patent Application No. 2003-382946 filed on Nov. 12, 2003, which is incorporated herein by reference in its entirety.

BACKGROUND OF THE INVENTION

1. Field of the Invention

The present invention relates to an apparatus and a method for displaying stereoscopic two-dimensional image and an image.

2. Description of the Related Art

In recent years, various attempts have been made to stereoscopically reproduce image information by various methods for the purpose of improving visibility and amusement features. Generally, binocular parallax is one physiological factor allowing a human being to view an object stereoscopically. As a method of reproducing a stereoscopic image on the basis of the binocular parallax, a polarization method is known in which a viewer wears polarized glasses and views left and right disparity images based on mutually different polarized states. However, the wearing of the polarized glasses constitutes a troublesome drawback to the viewer.

As a method of displaying a stereoscopic image which does not use polarized glasses, a lenticular lens method is known. The is a technique in which a plurality of screens are formed as latent images on one screen, the plurality of screens are viewed through a translucent screen in which semicylindrical lenses of fixed widths are connected in the horizontal direction, so as to enable stereoscopic representation or representation of moving images. Namely, images which are obtained by dividing each of the plurality of images into stripes in the vertical direction in correspondence with the pitches of the semicylindrical lenses are arrayed regularly, and stereoscopic vision is realized on the basis of the focal position of each lens which changes due to the direction in which the screen is viewed and the distance and on the basis of how the image disposed there is viewed. Specifically, for the reproduction of a stereoscopic image, alternately arrayed stripe images are supplied to both eyes of the viewer from two left and right disparity images corresponding to both eyes of the viewer by using the lenticular lenses, so as to allow a stereoscopic image to be recognized.

A conventional apparatus for displaying stereoscopic two-dimensional image using the method described above is disclosed in JP-A-10-221644.

SUMMARY OF THE INVENTION

With the above-described lenticular lens method, since a plurality of screens are formed as latent images on one screen, disparity images corresponding to both eyes of the viewer are required from the imaging stage. To supply these images, much operation is required, including such as computer image processing, lenticular lens design, and the operation of accurate combination of the lenses and the image. Accordingly, a display for displaying a stereoscopic two-dimensional image using lenticular lenses tends to be expensive.

Figure 1:
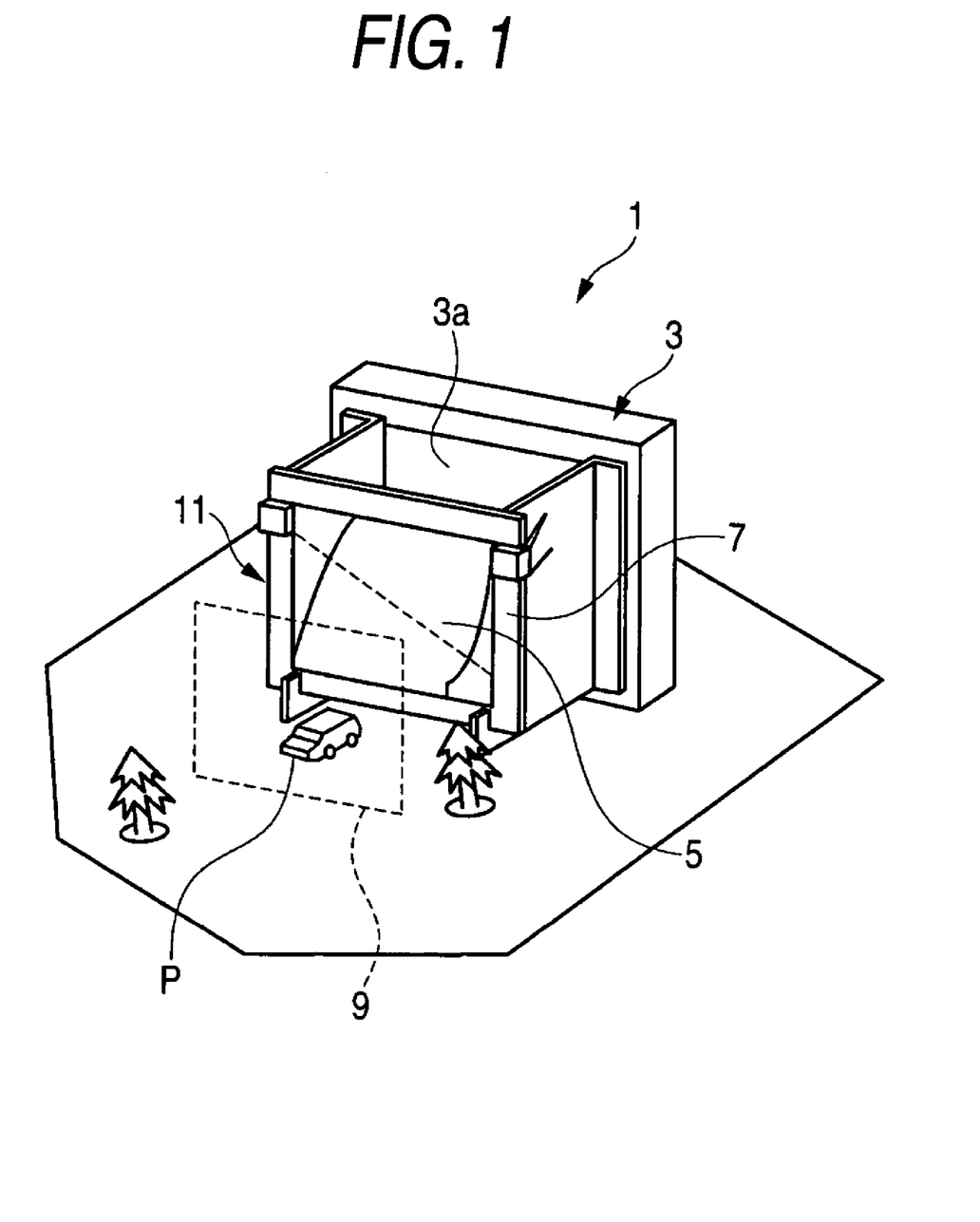
FIG. 1 is a perspective view illustrating a schematic configuration of a conventional image display apparatus.

To overcome such a drawback, an image display apparatus has been proposed for displaying a stereoscopic two-dimensional image with a simple configuration by allowing a two-dimensional image to be formed as a real image by microlens arrays. As shown in FIG. 1, the image display apparatus 1 includes a display unit 3 for displaying on a planar image display surface 3a a two-dimensional image including a stereoscopic image, as well as an image transmission panel 11 including a microlens array 5 disposed apart from the image display surface 3a and formed by a plurality of lenses and having a wider effective area than a stereoscopic image in the two-dimensional image and a lens frame area 7 surrounding an effective region of the microlens array 5. The image transmission panel 11 is adapted to display a stereoscopic two-dimensional image by generating an image forming plane 9 of a real image P of a two-dimensional image in a space located on a side opposite to the display unit 3. According to the image display apparatus 1, it is possible to stereoscopically display a two-dimensional image including a stereoscopic image with a very simple configuration. In addition, polarized glasses is not required, and the resolution of the stereoscopic image is not caused to decline.

With the above-described image display apparatus 1, however, the advantages derived from the fact that the two-dimensional image becomes stereoscopically displayable are not sufficiently produced. Namely, in the case of the stereoscopic two-dimensional image, unlike a planar image, the visual effect in the depthwise direction is enhanced, but if satisfaction is found only in the visual effect, it is impossible to obtain sufficient visibility and amusement features. Namely, a technique for allowing a stereoscopic two-dimensional image to be perceived as a more natural one is required. In addition, since the visual perception in the depthwise direction becomes possible, a new man-machine interface becomes realizable.

As the problem to be solved by the invention, it is possible to cite, among others, the problem that in the case of the stereoscopic two-dimensional image, unlike a planar image, the visual effect in the depthwise direction is enhanced, but if satisfaction is found only in the visual effect, it is impossible to obtain sufficient visibility and amusement features.

According to a first aspect of the present invention, there is provided an apparatus for displaying stereoscopic two-dimensional image including: an image display unit including a display device having an image display surface that displays a two-dimensional image and a microlens array disposed in spaced-apart relation to the image display surface, the image display unit that displays a stereoscopic two-dimensional image by allowing the light emitted from the image display surface to form an image on an image forming plane in a space located on a side opposite to the display device with respect to the the microlens array; at least one switch; at least one illumination device that illuminates the space when the switch is turned on; and a controller that controls the display device to change the two-dimensional image displayed on the image display surface in accordance with an illuminating state of the illumination device.

According to a second aspect of the invention, there is provided a method for displaying stereoscopic two-dimensional image including: displaying a stereoscopic two-dimensional image by allowing a light, which emitted from an image display surface of a display device that displays a two-dimensional image, to form an image on an image forming plane in a space located on a side opposite to the display device with respect to a microlens array that is disposed in spaced-apart relation to the image display surface; and controlling the display device to change the two-dimensional image displayed on the image display surface in accordance with an illuminating state of a illumination device that illuminates the space.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

Referring now to the drawings, a description will be given of preferred embodiments of the apparatus for displaying stereoscopic two-dimensional image in accordance with the invention.

Figure 2:
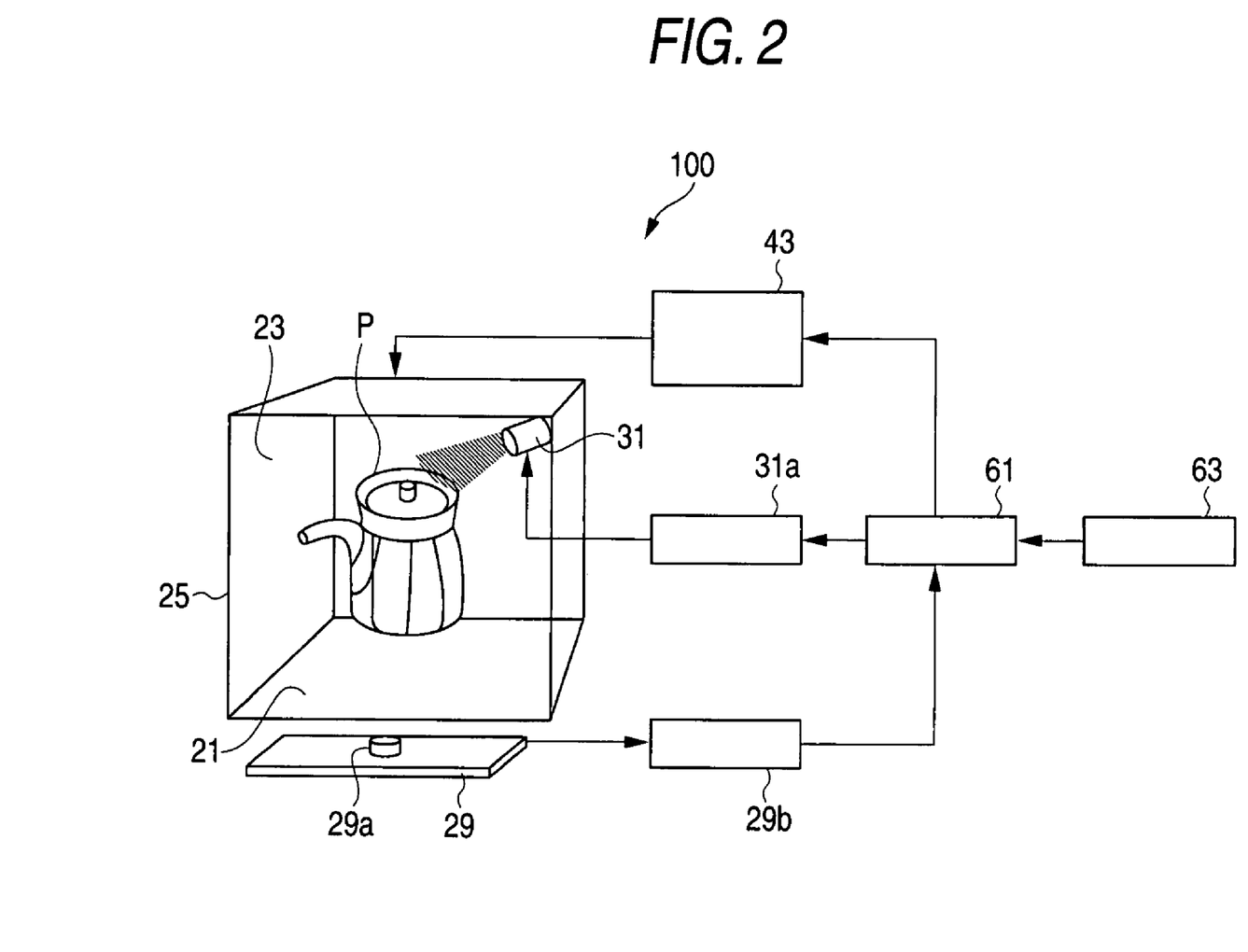
FIG. 2 is a schematic diagram of a first embodiment of an apparatus for displaying stereoscopic two-dimensional image in accordance with the invention.

FIG. 2 is a schematic diagram of a first embodiment of the apparatus for displaying stereoscopic two-dimensional image in accordance with the invention.

An apparatus 100 for displaying stereoscopic two-dimensional image in accordance with the embodiment can be suitably used as, for example, a display for sales promotion, a game apparatus, or the like. The apparatus 100 has a space 23 over a stage 21, and the space 23 is formed by a housing 25, for example. It should be noted that the space 23 is formed only over the stage 21, and the housing 25 is not necessarily an essential requirement.

Figure 3:
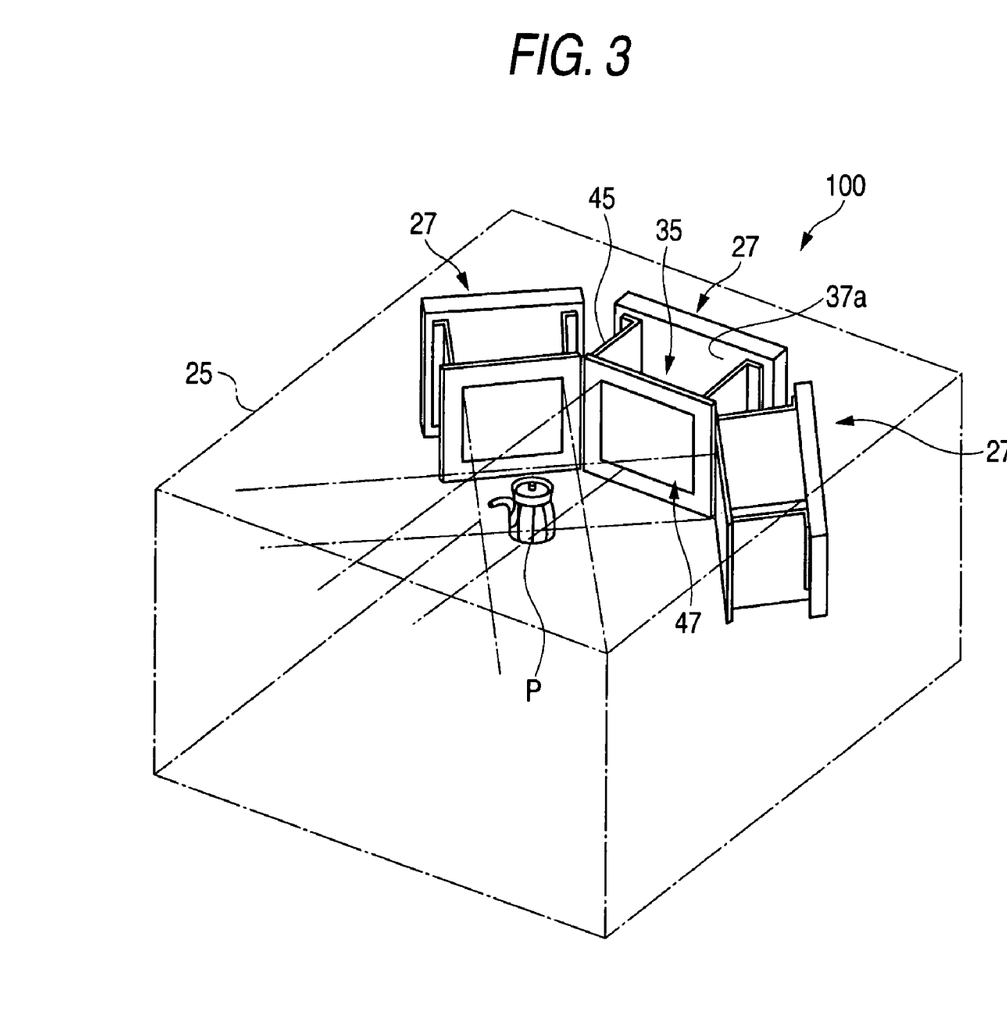
FIG. 3 is a perspective view illustrating image display units provided in the apparatus for displaying stereoscopic two-dimensional image shown in FIG. 2.

FIG. 3 is a perspective view illustrating image display units provided in the apparatus for displaying stereoscopic two-dimensional image shown in FIG. 2.

Image display units 27 are installed in the housing 25. As for the image display units 27, a single unit disposed in the center of the drawing may be used, or the plurality of units may be disposed at predetermined angles, as in the illustrated example. In the case where the plurality of image display units 27 are disposed, in a case where an identical image is displayed on all the image display units 27, it is possible to form a wide-ranging integrated visible area, and an identical image becomes visible from wide-ranging directions. On other hand, if a two-dimensional image in a front view is displayed on the central image display unit 27, and two-dimensional images in a right side view and a left side view of the two-dimensional image displayed on the central image display unit 27 are respectively displayed on the left and right image display units 27, the front and both sides of the two-dimensional image displayed on an image forming plane can be made visible from wide-ranging directions.

A switch 29 shown in FIG. 2 is installed in the vicinity of the housing 25, and the switch 29 has a button 29a which is pressed by a viewer's finger. A spotlight 31, which is an illumination device supported and fixed by, for example, the housing 25, is provided in the space 23. The switching on and off of the spotlight 31 is controlled by a controller which will be described later.

Figure 4:
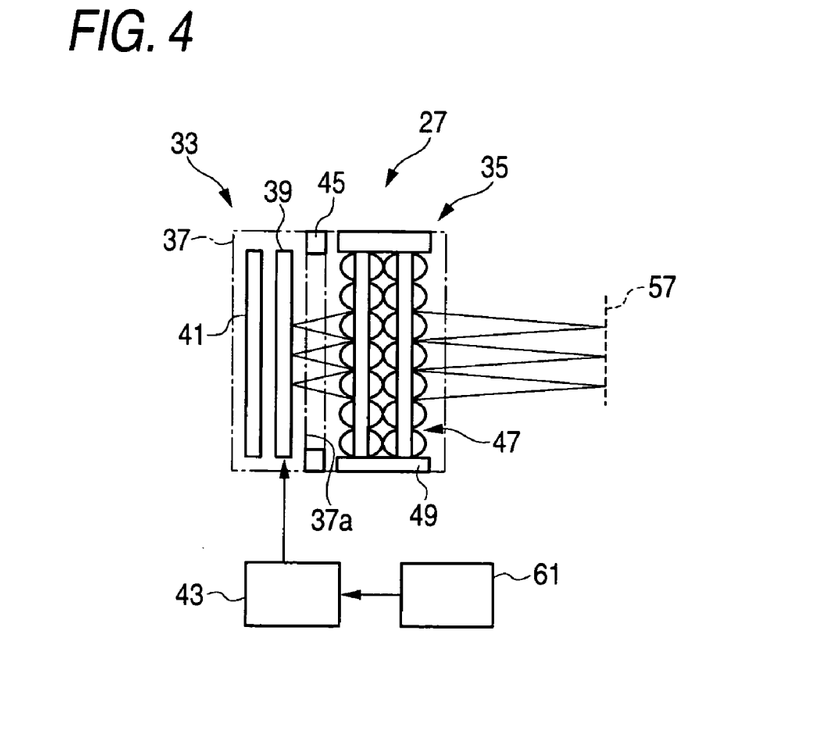
FIG. 4 is a cross-sectional view of an image display unit shown in FIG. 3.

FIG. 4 is a cross-sectional view of the image display unit 27 shown in FIG. 3.

The image display unit 27, if largely classified, includes a display portion 33 and an image transmission panel 35. The display portion 33 has, for instance, a color liquid-crystal display (LCD) 37 as a principal member. The LCD 37 has a planar image display surface 37a for displaying a two-dimensional image including a stereoscopic image. The LCD 37 is provided with a flat color liquid-crystal panel 39 of the image display surface 37a, a backlight illuminating portion 41, and a color liquid-crystal drive circuit 43. As the display portion 33, a cathode-ray tube, a plasma display, an organic electroluminescence display, or the like may be used instead of the LCD 37.

A support member 45 is fixed to peripheral edges of the LCD 37, and the support member 45 supports the image transmission panel 35. The image transmission panel 35 includes a microlens array 47, as well as a lens frame 49 surrounding an effective region of the microlens array 47. The support member 45 supports the lens frame 49, and disposes the image transmission panel 35 in a spaced-apart relation to the image display surface 37a of the color liquid-crystal panel 39.

The effective area of the microlens array 47 is set to be identical to the area of the image display surface 37a of the color liquid-crystal panel 39. The lens frame 49 has a dark color such as black, and suppresses the degree by which the viewer becomes conscious of the presence of the microlens array 47.

Figure 5:
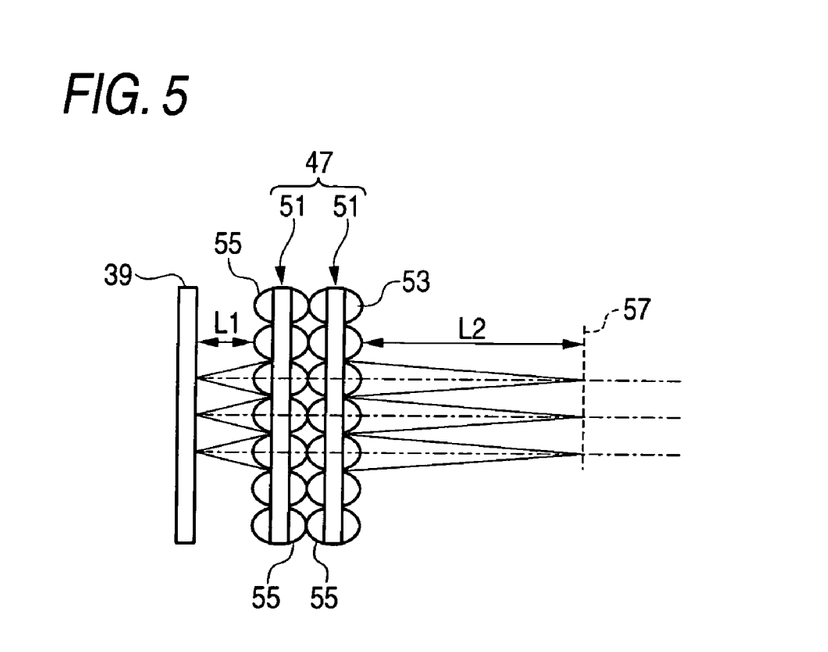
FIG. 5 is a partial cross-sectional view of a microlens array shown in FIG. 4.

FIG. 5 is a partial cross-sectional view of the microlens array shown in FIG. 4.

The microlens array 47 is composed of a plurality of microlenses arranged two-dimensionally. The microlens array 47 is a convex microlens plate formed by integrating two lens array halves 51 as a set. In the convex microlens plate, a plurality of lens systems each consisting of a pair of convex lenses with their optical axes arranged coaxially are arranged two-dimensionally so that their optical axes become parallel to each other.

The curvature of convex lenses 53 formed on the right-side surface of the right lens array half 51 in FIG. 5 is formed to be greater than the curvature of the other convex lenses 55. The distance L2 between the lens surface and an image-side focal point (image forming plane 57) of the right lens array half 51 in the drawing is longer than the distance L1 between the lens surface and the color liquid-crystal panel 39 of the left lens array half 51 in the drawing. Consequently, the image forming plane 57 is sufficiently spaced apart from the image transmission panel 35, and the depth of the image display unit 27 is made compact.

When the microlens array 47 is disposed in parallel to the front surface of the display portion 33 and at a position spaced apart the imaging length L1 of the substantially convex lens 55, the microlens array 47 projects the image displayed on the display portion 33 onto the image forming plane 57 spaced part the imaging length L2 on the opposite side to the display portion 33. Although the projected image is a two-dimensional image, in a case where the image is one which has depth (stereoscopic), the image is displayed as if it is floating in the space. Therefore, it appears to the viewer as if a stereoscopic image is being displayed. Hereafter, the two-dimensional image displayed on the image forming plane 57 will be referred to as a stereoscopic two-dimensional image P.

It should be noted that the two-dimensional image displayed on the display portion 33 is vertically inverted when it passes through one lens array half 51, but the two-dimensional image is inverted again when it passes through the other lens array half 51. As a result, the image transmission panel 35 is capable of displaying the two-dimensional image displayed on the display portion 33 as an erect stereoscopic two-dimensional image on the image forming plane 57.

As shown in FIG. 2, the apparatus 100 is provided with a controller 61. A switch drive unit 29b of the switch 29 is connected to the controller 61, and the switch drive unit 29b converts the pressing operation of the switch 29 into an operation signal and transmits it to the controller 61. Further, the spotlight 31 is connected to the controller 61 through a light drive unit 31a, which controls the switching on and off of the spotlight 31 by receiving a switching on/off signal from the controller 61. The controller 61 transmits the switching on/off signal to the light drive unit 31a in response to the operation signal inputted from the switch drive unit 29b.

In addition, a video signal supplying unit 63 is connected to the controller 61, and the video signal supplying unit 63 supplies a video signal for the two-dimensional image including a stereoscopic image to the controller 61. Further, the LCD 37 is connected to the controller 61 through the color liquid-crystal drive circuit 43, which outputs a display drive signal to the LCD 37 on the basis of the video signal for the two-dimensional image transmitted from the controller 61. At the time, upon receiving the operation signal from the switch drive unit 29b, the controller 61 outputs the video signal supplied from the video signal supplying unit 63 to the color liquid-crystal drive circuit 43 as a converted video signal in which the lighting (display of brightness) has been changed by the spot light 31.

Next, a description will be given of the operation of the apparatus for displaying stereoscopic two-dimensional image in accordance with the above-described embodiment.

When the display of the apparatus 100 is driven, since the lens frame 49 is black, it is possible to conceal the support member 45 from the viewer's side. When a two-dimensional image is being formed on the image display surface 37a of the image display unit 27, the two-dimensional image is formed on the image-side focal plane, and a real image of the stereoscopic two-dimensional image P becomes visible substantially from direction of the optical axis.

In the two-dimensional image including a stereoscopic image to be displayed, if a portion other than the stereoscopic image, such as the background, is formed as a two-dimensional image of a dark color such as black, since the support member 45 and the like are black, the two-dimensional image is recognized by the viewer as if only a real image to be displayed is floating in the front and as if it is a three-dimensional image.

If the viewer presses the button 29a in a state in which the stereoscopic two-dimensional image P is being displayed, an operation signal is inputted from the switch drive unit 29b to the controller 61. Upon receiving the operation signal from the switch drive unit 29b, the controller 61 outputs to the color liquid-crystal drive circuit 43 the video signal supplied from the video signal supplying unit 63 as a converted video signal in which the display of brightness has been changed by the spotlight 31. Consequently, the stereoscopic two-dimensional image P is displayed such that a predetermined portion is brightly lit and reflects the light just as if it is illuminated by an actual spotlight 31.

Therefore, according to such an image displaying method, if the button 29a is pressed in the state in which the stereoscopic two-dimensional image P is displayed in the space 23 over the stage 21, the spotlight 31 illuminates. The two-dimensional image for which the display of brightness has been changed is displayed on the display portion 33 in correspondence with the spotlight 31 which has been lit up by the operation of the switch 29. Thus, a predetermined portion of the stereoscopic two-dimensional image P becomes bright. Therefore, the stereoscopic two-dimensional image P, which is normally not illuminated by the irradiation with the light, appears to be bright as if it is actually being struck by the light. As a result, an expectation contrary to the common sense becomes real, so that unexpectedness and satisfaction can be obtained, and highly attractive amusement features can be produced.

In addition, according to the above-described apparatus 100, there are provided the microlens array 47 for stereoscopically displaying the two-dimensional image displayed on the display portion 33, the spotlight 31 which is lit up by the switch 29, and the controller 61 for displaying the stereoscopic two-dimensional image on the display portion 33 by lighting it in correspondence with the lighting up of the spotlight 31. Therefore, if the stereoscopic two-dimensional image P displayed on the image forming plane 57 is illuminated by the light from the spotlight 31, a two-dimensional image which has changed in interlocking relation to the operation of the controller 61 is displayed on the display portion 33 by the controller 61, and the stereoscopic two-dimensional image P which is illuminated by the light is displayed on the image forming plane 57. In consequence, the stereoscopic two-dimensional image P can be displayed in association with the operation of the actual spotlight 31, and visibility can be improved. Furthermore, it is possible to produce an unexpectedness in which a real object and an image are integrated and to obtain effective amusement features.

In addition, since an actual object is not lit by the actual light, it is possible to freely set the color, lightness, range, the amount of reflection, and the like of a portion to be illuminated, irrespective of the actual light of the spotlight 31. Furthermore, since the side surfaces of the stereoscopic two-dimensional image P can be illuminated brightly, changes of side surfaces of the stereoscopic image become visible, which is impossible with a planar image, and it becomes possible to provide a man-machine interface making active use of the features of the stereoscopic two-dimensional image P.

It should be noted that, in the above-described embodiment, the microlens array 47 is made a convex microlens plate formed by integrating the two lens array halves 51 as a set, the invention is not limited to the same, and the microlens array 47 may be formed by a single lens array half. In such a case, however, since the two-dimensional image which is displayed on the display portion 33 is displayed inversely on the image transmission panel 35, as already described, it suffices if the controller 61 inverts in advance the video signal supplied from the video signal supplying unit 63 and transmits it to the display portion 33.

It should be noted that in a case where the convex microlenses are allotted in one-to-one correspondence to display pixels provided on the image display surface 37a of the display portion 33, the two-dimensional image is not displayed inversely on the image transmission panel 35, so that there is no problem even if only a single lens array half 51 is disposed.

Next, a description will be given of a second embodiment of the apparatus for displaying stereoscopic two-dimensional image in accordance with the invention.

Figure 6:
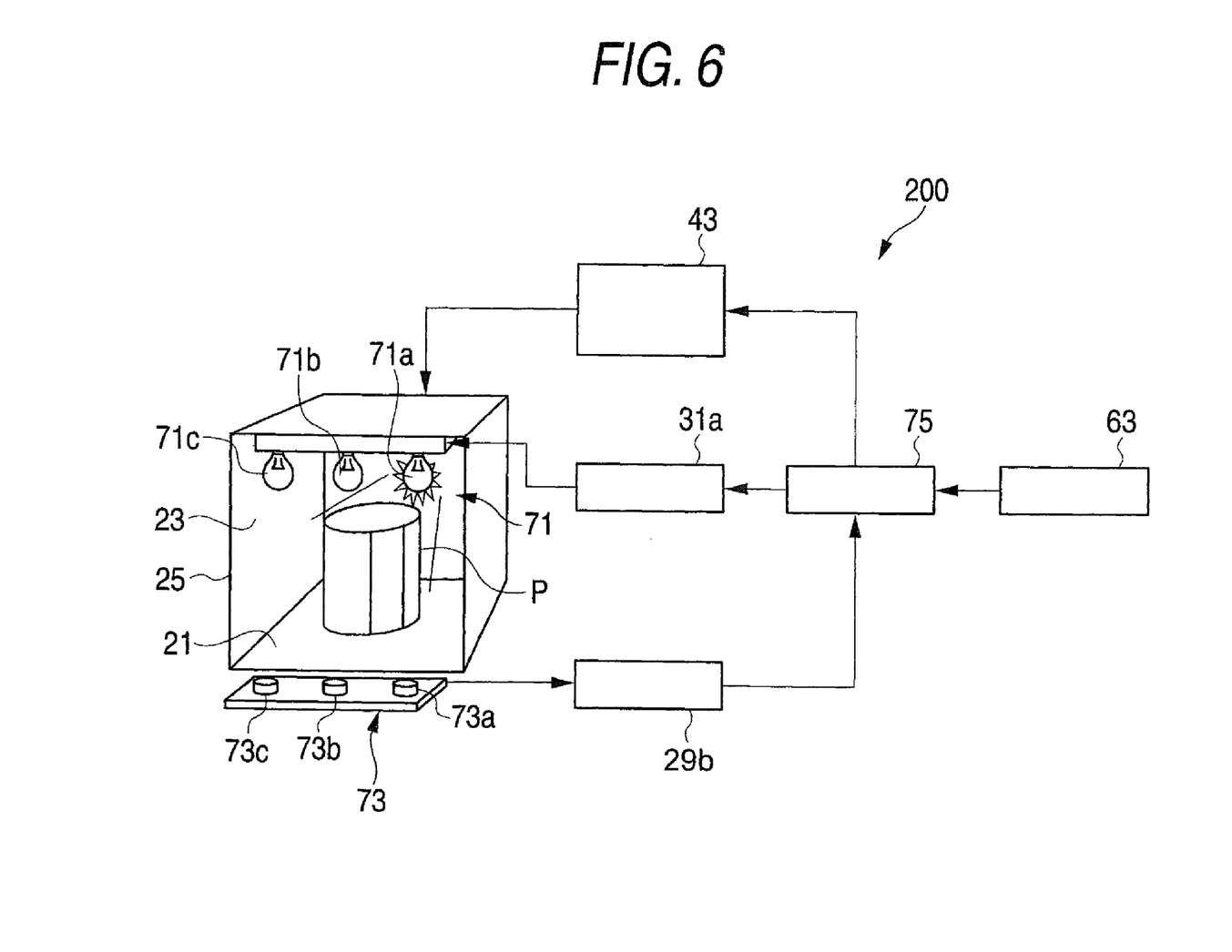
FIG. 6 is a schematic diagram of a second embodiment of the apparatus for displaying stereoscopic two-dimensional image in accordance with the invention.
Figure 7:
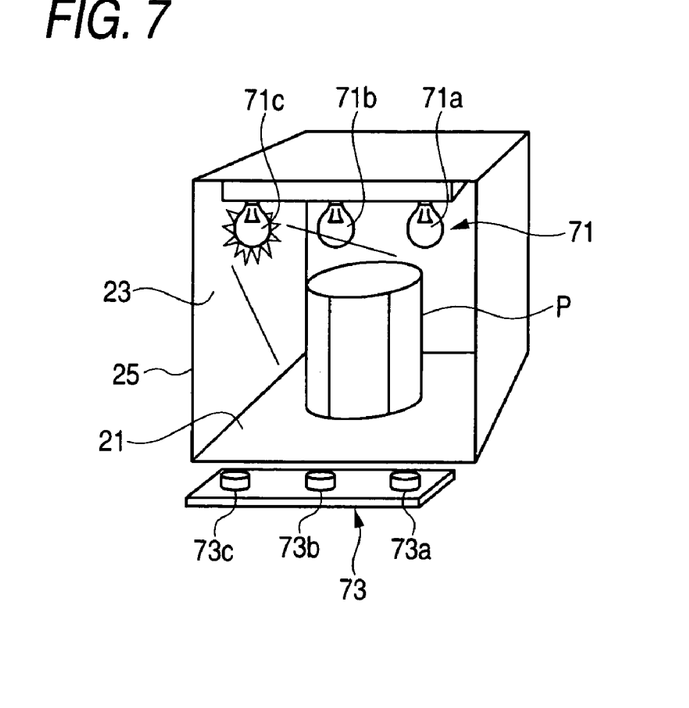
FIG. 7 is a diagram explaining the operation in a case where a different illumination device is lit up.

FIG. 6 is a schematic diagram of the second embodiment of the apparatus for displaying stereoscopic two-dimensional image in accordance with the invention. FIG. 7 is a diagram explaining the operation in a case where a different illumination device is lit up. It should be noted that, in the following embodiments, members identical to those shown in FIGS. 2-5 will be denoted by the same reference numerals, and a redundant explanation will be omitted.

An apparatus 200 for displaying stereoscopic two-dimensional image according to the embodiment has a plurality of (in the embodiment, three) lights 71 disposed in the space 23, as well as a plurality of switch 73 provided in correspondence with the respective lights 71 to control the lighting of the lights 71. The arrangement provided is such that the display of the brightness of the two-dimensional image is changed by a controller 75 in correspondence with the lighting of the lights 71 which are changed over by the switch 73.

For example, if a right-end button 73a of the switch 73 is pressed, a right-end light 71a illuminates, and the stereoscopic two-dimensional image P whose right-hand side became bright is displayed in a state in which it is lit up at an angle of illumination by the light 71a. Meanwhile, if a left-end button 73c of the switch 73 is pressed, a left-end light 71c illuminates, as shown in FIG. 7, and the stereoscopic two-dimensional image P whose left-hand side became bright is displayed in a state in which it is lit up at an angle of illumination by the light 71c.

Therefore, according to the apparatus 200, the plurality of lights 71 and the switch 73 for controlling the lighting of the lights 71 are provided, and the display of the brightness of the two-dimensional image is changed in correspondence with the lighting of the lights 71 which are changed over by the switch 73. Accordingly, the stereoscopic two-dimensional image P can be shown just as if it is lit up by an actual illumination device in correspondence with the respective lights 71. Consequently, it is possible to enhance the amusement features.

Next, a description will be given of a third embodiment of the apparatus for displaying stereoscopic two-dimensional image in accordance with the invention.

Figure 8:
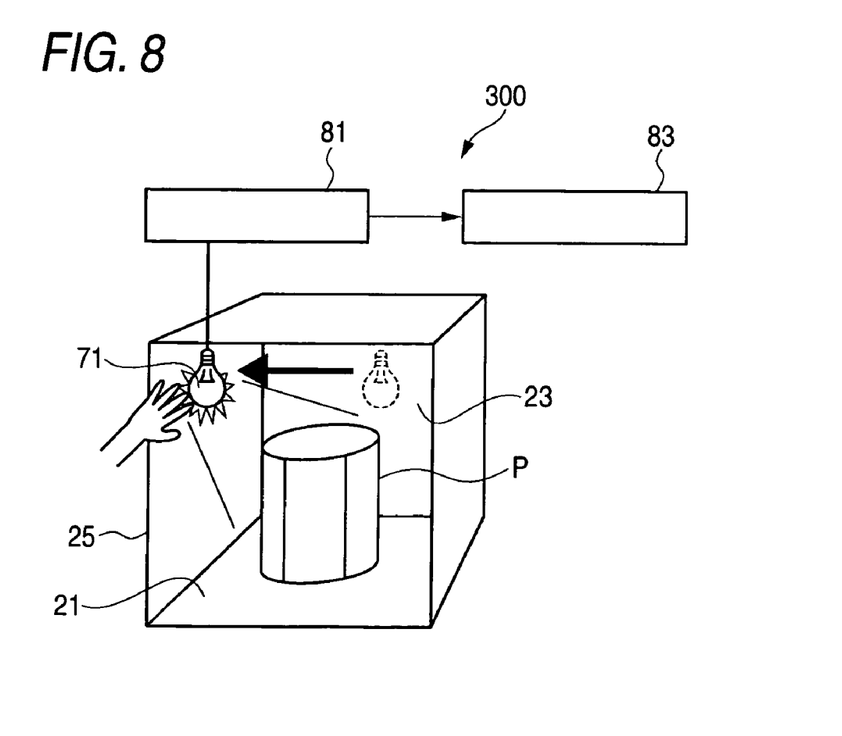
FIG. 8 is a schematic diagram of a third embodiment of the apparatus for displaying stereoscopic two-dimensional image in accordance with the invention.

FIG. 8 is a schematic diagram of the third embodiment of the apparatus for displaying stereoscopic two-dimensional image in accordance with the invention.

An apparatus 300 for displaying stereoscopic two-dimensional image according to the embodiment has the light 71 which is disposed in the space 23 so as to be movable by a moving mechanism 81, an unillustrated position information outputting device for outputting the position information of the light 71, and a controller 83 for changing the display of the brightness of the two-dimensional image in correspondence with the position information of the light 71. In addition, although not shown, connected to the controller 83 are the video signal supplying unit 63, the color liquid-crystal drive circuit 43, and the light drive unit 31a.

The moving mechanism 81 can be configured by a rack extending in the moving direction of the light 71, a frame holding the light 71 attached slidably to the rack, and a pinion provided rotatably on the frame and meshing with the rack. Further, the rotation of the pinion is adapted to be detected by an optical encoder, which serves as a position information outputting device, as the position information of the light 71. Consequently, the amount of displacement of the light 71 is detected as a pulse signal. As the pulse signal is transmitted to the controller 83, the controller 83 can be caused to numerize and grasp the position of the light 71, so that the specification and change of the portion to be illuminated in the two-dimensional image which changes relative to the position of the light 71 are calculated.

The optical encoder has a light shielding plate provided with a row of slits, as well as an optical sensor disposed on either side or one side of the light shielding plate so as to oppose the row of slits. The optical sensor is fixed to the frame, while the light shielding plate is fixed to the pinion which is an object to be detected. As a result, as the pinion rotates, the interruption and non-interruption of the optical axis of the optical sensor are repeated by the row of slits of the light shielding plate, and a pulse train signal corresponding thereto is generated. The amount of movement of the frame is detected by the number of these pulses. It should be noted that if a plurality of optical sensors are provided, the phase difference of the pulse train can be detected from output signals of the respective optical sensors, so that the direction of movement of the frame can be discriminated.

Accordingly, if the light 71 which is in the lit-up state at the right end is moved toward the left side by being gripped with the viewer's fingers, that position of movement is consecutively detected by the position information outputting device, the stereoscopic two-dimensional image P is displayed which is in a state of being lit up at an angle of illumination based on the position information at that position of movement.

It should be noted that as the position information inputting device provided on the moving mechanism 81, in addition to the above-described optical encoder, it is possible to use an encoder which detects the amount of displacement by counting pulse widths on the basis of a result of detection by, for example, a linear encoder, a laser distance meter using polarization interferometry, or the like.

According to the apparatus 300, there are provided the light 71 which is disposed so as to be movable by the moving mechanism 81, as well as the controller 83 for changing the display of the brightness of the two-dimensional image on the basis of the position information of the light 71 obtained by the position information outputting device. Therefore, if the stereoscopic two-dimensional image P displayed on the image forming plane 57 is illuminated by the light while moving the light 71, a two-dimensional image whose illuminated portion has changed in interlocking relation to that movement is displayed on the display portion 33 by the controller 83, and the stereoscopic two-dimensional image P corresponding to the position of the light 71 is displayed on the image forming plane 57. In consequence, the stereoscopic two-dimensional image P can be displayed in association with the moving operation of the actual light 71, and visibility can be improved. Furthermore, it is possible to produce an unexpectedness in which a real object and an image are integrated and to obtain effective amusement features.

In the embodiments described above, each of the apparatuses 100, 200 and 300 have one of the controllers 61, 75 and 83, and the controllers 61, 75 and 83 are separately shown in the figures. However, the apparatus according to the invention may include one or more of the above-described controllers 61, 75 and 83. Also, the controllers 61, 75 and 83 may be integrally provided in the apparatus and the features obtained by each of the controllers 61, 75 and 83 may be realized by a single controller.

Although in the above-described embodiments a description has been given by citing as an example the case in which the illumination device is a real object, the apparatus for displaying stereoscopic two-dimensional image in accordance with the invention may be a apparatus for displaying stereoscopic two-dimensional image P in which the illumination device is displayed on the image forming plane 57. In the case, a position detecting sensor such as a laser distance meter for detecting the position of the viewer's hand which tries to tough the illumination device is provided in the space 23. Then, if the amount of displacement of the hand is detected by the position detecting sensor, by transmitting its detection signal to the above-described controller 83, a two-dimensional image which changed in interlocking relation to that movement can be displayed on the display portion 33 by operation similar to the one described above. In the case, since the illumination device which is actually movable need not be provided in the space 23, the structure of the apparatus for displaying stereoscopic two-dimensional image can be simplified.

It should be noted that the display portion 33, the image forming plane 57, and the microlens array 47 used in the embodiments need not be installed in parallel to each other.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. An apparatus for displaying stereoscopic two-dimensional image, the apparatus comprising:
    an image display unit including a display device having an image display surface that displays a two-dimensional image and a microlens array disposed in spaced-apart relation to the image display surface, wherein the image display unit displays a stereoscopic two-dimensional image by allowing the light emitted from the image display surface to form an image on an image forming plane in a space located on a side opposite to the display device with respect to the microlens array;
    at least one switch;
    at least one illumination device that illuminates the space when the switch is turned on;
    a controller that controls the display device to change the two-dimensional image displayed on the image display surface, so as to change a brightness of the two-dimensional image, in accordance with an illuminating state of the illumination device;
    a moving mechanism that allows to move a position where the illumination device is disposed; and
    a position information outputting device that detects the position and outputs information indicating the position,
    wherein the controller controls the display device to change the two-dimensional image in accordance with the information output by the position information outputting device.

2. The apparatus according to claim 1, wherein the position information outputting device includes an optical encoder that detects the position of the illumination device.

3. A method for displaying stereoscopic two-dimensional image comprising:
    displaying a stereoscopic two-dimensional image by allowing a light emitted from an image display surface of a display device that displays a two-dimensional image, to form an image on an image forming plane in a space located on a side opposite to the display device with respect to a microlens array that is disposed in spaced-apart relation to the image display surface;
    controlling the display device to change the two-dimensional image displayed on the image display surface, so as to change a brightness of the two-dimensional image, in accordance with an illuminating state of a illumination device that illuminates the space;
    moving a position where the illumination device is disposed; and
    detecting the position and outputting information indicating the position,
    wherein the display device is controlled to change the two-dimensional image in accordance with the output information.

* * * * *